United States Patent [19]

Marks

[11] 3,841,732
[45] *Oct. 15, 1974

[54] DIPOLAR ELECTRO-OPTIC STRUCTURES AND METHOD

[76] Inventor: Alvin M. Marks, 153-16 10th Ave., Whitestone, N.Y. 11357

[*] Notice: The portion of the term of this patent subsequent to May 19, 1987, has been disclaimed.

[22] Filed: Mar. 4, 1970

[21] Appl. No.: 16,280

[52] U.S. Cl............. 350/160 R, 350/267, 350/290
[51] Int. Cl............................ G02f 1/30, G02f 1/38
[58] Field of Search .. 350/267, 160, 160 R, 160 LC

[56] References Cited
UNITED STATES PATENTS

| | | | |
|---|---|---|---|
| 1,963,496 | 6/1934 | Land | 350/267 |
| 2,543,793 | 3/1951 | Marks | 356/267 |
| 2,792,752 | 5/1957 | Moncrieff-Yeates et al. | 350/160 R |
| 3,040,625 | 6/1962 | Zito | 350/267 |
| 3,257,903 | 6/1966 | Marks | 350/267 |
| 3,322,485 | 5/1967 | Williams | 350/160 LC |
| 3,363,239 | 1/1968 | Alexander | 350/267 UX |
| 3,451,742 | 6/1969 | Marks | 350/267 X |
| 3,512,876 | 5/1970 | Marks | 350/267 |

*Primary Examiner*—John K. Corbin
*Assistant Examiner*—V. P. McGraw
*Attorney, Agent, or Firm*—Philip D. Amins

[57] ABSTRACT

Methods and electro-optical panels are disclosed for controlling the transmission, absorption, and reflection of light and related forms of electro-magnetic radiation by the electrical orientation, and the disorientation of submicron asymmetrical dipolar particles in an ionic or nonionic suspending transparent fluid medium.

21 Claims, 9 Drawing Figures

PATENTED OCT 15 1974

INVENTOR.
ALVIN M. MARKS
BY
ATTORNEY

PATENTED OCT 15 1974 3,841,732

INVENTOR.
ALVIN M. MARKS

ATTORNEY

DIPOLAR ELECTRO-OPTIC STRUCTURES AND METHOD

BACKGROUND

This application is a continuation in part of an application for a patent entitled, "Dipolar Electro-Optic Structures and Method," Ser. No. 378,836 filed June 28, 1964, now U.S. Pat. No. 3,512,876.

It has previously been suggested to employ a suspension of dipolar particles as a light-controlling element, and to orient the particles in such a suspension of the application of an external electric field. Prior art devices of this type had little use because of important deficiencies. There was a tendency for the oriented particles to coagulate. The ratios of maximum to minimum transmittances, or reflectances, were too small. Clear suspensions of dipolar particles were not available. The orientation of the dipoles in an applied electric field and disorientation when the field was off was slow.

Accordingly, it is an object of the present invention to provide methods and apparatus for electrically controlling light and other electromagnetic radiation through the medium of an improved dipole particle suspension.

Another object is to provide light-controlling compositions and devices as aforesaid, characterized by improved electro-optical characteristics, greater electrodichroic ratios, reater electrodichroic sensitivity and requiring less time to align when an electrical field is applied, and less time to randomize an oriented suspension in the absence of an electric field.

An object is to provide an electro-optical sheet having an electrodichroic ratio in excess of 10.

Another object is to provide a thin electro-optical light control device of large area also herein termed a panel, window or shutter, suitable for use as an electrically controlled variable density window, visor, shutter, mirror, sunglass, prescription lens, radiation control panel, beam splitter and the like.

A feature of the present invention is the use as a light-controlling medium of a suspension of dipole particles having optimum optical and electrical properties resulting from novel relationships established amongst the physical dimensions, resistivity, concentration, and suspending fluid viscosity.

Still another feature is the utilization of the "antenna effect" influencing the optical properties of dipolar particles, as hereinafter more fully described.

Another feature of the present invention is the control of alignment rise time to maximum transmittance of a suspension of dipolar particles by the concentration of the dipolar particles, the dipole particle dimensions, the viscosity of the suspending fluid, and the intensity of pulsed alternating electric fields.

A feature of one embodiment of this invention is a novel electrooptical iris diaphragm.

Other objects, advantages, and novel features of the present invention will become apparent from the following more complete description and claims.

DEFINITIONS

Electrodichroism as used herein, is an electrooptical property of dipolar suspensions comprising a change in the transmission or reflection of light upon application of an electric field to a dipolar suspension.

Optical Density is defined as the negative logarithm to the base 10 of the light transmittance of an optical element.

The Electrodichroic Ratio is defined as the ratio of the optical density in the opaque condition for dipoles in random orientation, to the optical density in the transparent condition for dipoles partially or completely oriented in the electric field direction. For most applications an electro-optical device must have an electrodichroic ratio $q_{rz}$ of 10 or preferably more. For example, for a random state minimum transmission is 0.1 percent, OD = 3.0; for an aligned state maximum transmission is 50 percent, OD = 0.3; the transmission ratio = 500, and the electrodichroic ratio = 10.

The Parallel Electrodichroic Ratio refers to the electric field applied parallel to the light path, and the normal electrodichroic ratio refers to the electric field applied normal to the light path.

The Electrodichroic Response is defined as the rate of change of electrodichroic ratio with respect to the change in the electric field intensity.

The Electrodichroic Sensitivity is defined as the rate of change of electrodichroic ratio with respect to the change in electric field intensity, per unit of mass in a unit area in the optical path. Thus the electrodichroic sensitivity is the electrodichroic response per unit mass of a dipole suspension.

Relaxation means the disorientation, in the absence of an aligning field, of previously aligned dipolar particles.

Relaxation Time Factor is defined as the time required for the optical density of a previously aligned dipole suspension to increase by 1/e of the difference between maximum and minimum optical density, where $e$ is 2.71.

The Plane of the Panel, considered as a thin, flat container, is taken as the XY plane, X generally being considered the horizontal and Y the vertical axis. The direction of incident light normal to the plane of the panel is taken as the Z axis.

SUMMARY OF THE INVENTION

In one form, the present invention contemplates a light controlling device employing a suspension of minute dipole particles, said particles having at least one dimension large relative to at least one other dimension, and orientable in response to an applied electric, magnetic or mechanical shear field.

In one form of this invention of the electro-optical light control device comprises a tank-like panel containing a suspension of dipole particles in a transparent medium. The dipoles in the panel are capable of interacting with electromagnetic radiation, said panel having spaced transparent major walls and being provided with spaced, transparent electrically conductive films generally parallel with the transparent major walls.

DESCRIPTION OF THE DRAWINGS

The invention consists in the construction, combination and arrangement of parts and of operating steps as hereinafter more fully described and claimed, and as illustrated in the drawings, in which drawings like parts are given the same reference numeral throughout, and in which:

Light-controlling devices according to this invention are useful in varying embodiments, as camera shutters, variable iris diaphragms, variable density windows, visors and mirrors for automobiles, opthalmic and optical elements, 2-dimensional and 3-dimensional displays, reflecting and absorbing panels for buildings, air and spacecraft, decorative displays, signalling devices, and in a variety of other ways which their novel characteristics will readily suggest to those skilled in the art.

DESCRIPTION OF THE PREFERRED EMBODIMENTS

The dipole particles useful in the present invention are characterized in that they have at least one dimension large relative to at least one other dimension— that is to say, they are in the form of flakes, strips, needles or the like. The dipole particles should have at least one dimension equal to one-half of the wave length of the radiation to be controlled, (normally, visible light, but in some cases infrared, ultraviolet, microwave, or other portions of the electromagnetic spectrum) and at least one other dimension substantially smaller than one-half of said wave length. The dimensional ratio — that is, whether the particles is a needle, a strip or a flake— depends on the requirements of the specific embodiment of the invention, as more fully discussed below.

For purposes of brevity, the term "light" is used throughout the present specification and claims in a generic sense and is intended to encompass not only visible light but also infrared and ultraviolet "light," as well as microwave radiation in the neighboring portions of the electromagnetic spectrum.

In addition to the dimensional requirements herein disclosed, the electrical or magnetic properties of the dipolar particles, i.e., conductivity or dielectric constant must be such as to facilitate orientation in an electric field, and strong interaction with electromagnetic radiation.

The suspending medium is preferably an insulating nonionic fluid, non-reactive with the dipole particles, or is a material capable of being converted to a fluid by an increase in temperature or thixotropy.

It is not in all cases necessary that the suspending medium be in the liquid state. Providing the applied torque is sufficiently strong to orient the dipole particles against a certain amount of plastic resistance of the suspending medium, it is sufficient if the suspending medium is in a deformable, thermoplastic or thixotropic state. The term "fluid" as used herein should therefore to understood to encompass such a plastic condition. For most applications of the present invention, the suspending medium is a liquid during alignment or disorientation of the dipole particles.

The major factor in effecting orientation of the dipolar particles in an applied field is induced dipolarity. The induced dipolarity in an electric field of the dipolar particle may result from its possessing the properties of semi-conductivity, or conductivity which permits opposing charges to accumulate at the long opposite ends of the dipole particle. Alternatively, the dipolarity may result from a difference between the dielectric constant of the insulating dipole particles and that of the surrounding medium.

Ordinarily, when an insulating dipole particle has a larger dielectric constant than the suspending medium, the electric field between a positive and a negative electrode concentrates in the particle. In so doing the particle acquires an induced dipolarity, the end of the particle nearer the positive electrode acquiring an induced negative charge, and vice versa. The induced dipolarity causes the dipole particle to orient by turning so that the end having the induced positive charge points directly toward the negative electrode, and vice versa.

Suitable dipole particles according to the present invention, therefore, include such dichroic materials as herapathite crystals, (iodoquinine sulphate) or metal whisker crystals, flakes or strips, such as aluminum, aluminum nickelide $Al_3Ni$, antimony, cadmium, chromium, copper, gold, indium, lead, palladium, platinum, silver, tantalum, titanium, thalium, tungsten and zinc, as well as other materials which, by virtue of their shape, dielectric constant or conductivity characteristics tend to concentrate the electric field within the dipole particle and align for a maximum electrodichroic ratio parallel to an applied electric field. Needle or elongated flat strips employed have a length $\tau/2n$ which varies from about 0.14 to $0.3\mu$; and a thickness of 50–250A, while flakes are 1–$5\mu$, and the same thickness range.

When reference appears herein to "dipolar particles," or "dipoles," it is therefore intended to include conductive asymmetric particles and insulating asymmetric particles having a substantial difference in dielectric constant from the medium in which they are suspended.

To illustrate the above considerations with reference to some specific examples, dipole particles may be insulating providing the difference in dielectric constant or index of refraction between the particle and the liquid in which they are suspended is substantial. An example of this is lead carbonate which forms minute hexagonal flakes having an index of refraction of approximately 2.25 and which may be suspended in a fluid having a relative index of refraction of approximately 1.5. Another example is Graphite.

Herapathite forms flat needles having a dimensional ratio of about 25 to 1, and greater index of refraction than the suspending fluid, which may be, for example, equal parts of toluol, isopentyl acetate and diphenyl chloride. Moreover, these needles polarize transmitted light because of their molecular structure.

Another class of materials are those comprising metal whisker crystals, metal strips, or flakes which show strong electrooptic effects, align readily in the smallest fields, and show the "antenna effect," as hereinafter described.

THE DIPOLE PARTICLE

Figures 1, 2, 3, 4, 5, 6:
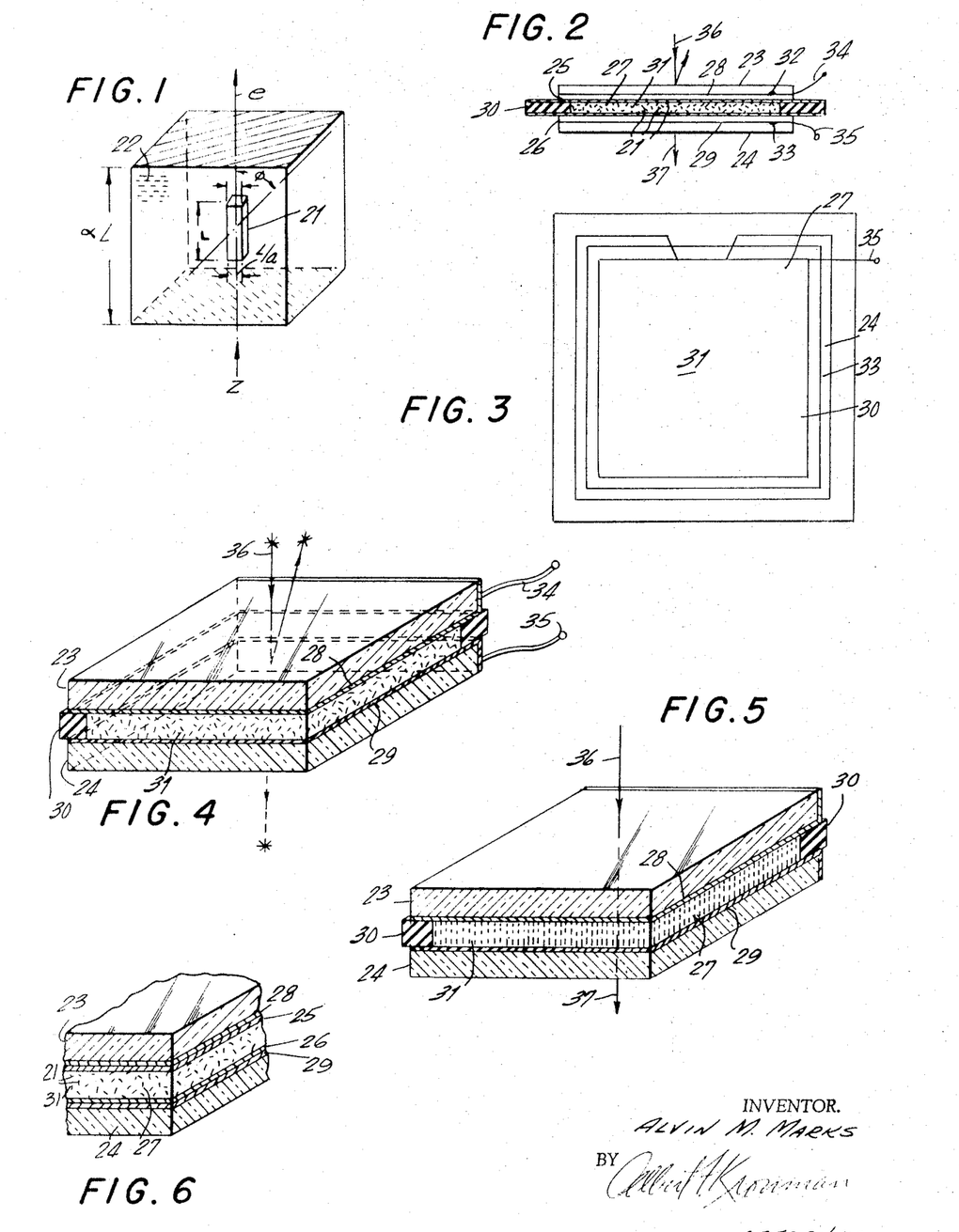
FIG. 1 is a diagrammatic view, on a greatly enlarged scale, of a single dipole in an elementary volume of suspending fluid.
FIG. 2 shows the top view of an electrooptic cell for actuating a dipole fluid.
FIG. 3 shows a side view of the cell shown in FIG. 2.
FIG. 4 is a fragmentary view on an enlarged scale of an electrically responsive light-controlling structure made in accordance with the present invention showing disoriented dipole particles in a reflecting or light absorbing state.
FIG. 5 is a view similar to FIG. 4, showing the dipole particles in aligned orientation, with the long dimension of the particle normal to the plane of the structure, in a transmissive state.
FIG. 6 is a fragmentary view similar to FIGS. 4 and 5, showing a protective coating between the conductive coating and the dipole suspension.

FIG. 1 diagrammatically shows a single dipole particle 21 of length L and thickness of L/a in an elementary cubic volume of a suspending fluid 22. The cross section of the dipole is shown as square for simplicity. The dipole particle is shown aligned along the Z axis, but may be tilted through any angle, acting as a rotable dipole antenna with self-resistance.

For maxiumum interaction (absorption or reflection with electromagnetic radiation of wave length $\tau$), the dipole particle length is $\tau/2n$ where n is the index of refraction of the fluid; usually about 1:5; so that, the dipole length is then about $\tau/3$. The thickness of a metal dipole L/a depends on whether the dipole is to be reflecting or absorbing, and upon the resistivity of the metal.

The length to width ratio $a$ controls the band width of resonant response of the dipole to radiation. The length L of the dipole determines the wave length range to which the dipoles are tuned to absorb or reflect. The cross section of the dipole for absorption or reflection depends on the orientation of the dipole, which is controlled by the electric field and Brownian motion.

CONDUCTIVE FILMS

In the practice of the present inventions, suitable transparent electrically conductive coatings are required which are known to the art. One such material is a stannic oxide film on glass or plastic such as is sold by the Liberty Mirror Co. under the designation EL-SX: by Pittsburgh Plate Glass Co. under the designation NESA. These transparent conductive films have a transmission of between 70 and 90 percent, at 10 to 10,000 ohms/sq.

ELECTRO-OPTICAL LIGHT CONTROLLING PANEL

Referring now to the drawings and more particularly to FIGS. 2 and 3; 23 and 24 are transparent sheets of glass, plastic or the like. A gasket 30 is disposed between the sheets 23 and 24 and adjacent the edges thereof to space the sheets, and to form a thin tank-like area 31 between said sheets. The thin tank-like area 31 between sheets 23 and 24 is filled with a fluid 27 in which the dipole particles 21 are suspended. Transparent electrically conducting layers 28 and 29 are applied to the inner surfaces of sheets 23 and 24. Transparent protective layers 25 and 26 are applied over the transparent conducting layers 28 and 29 on the surfaces of sheets 23 and 24 to insulate and separate the dipole fluid layers 27 from the transparent conducting layers 28 and 29.

The gasket 30 may extend beyond the transparent sheets 23 and 24 to provide a longer electrical air path to eliminate arcing at the edge of the sheets between the conducting layers 28 and 29.

The conductive layers 28 and 29 are connected to highly conductive peripheral metallic bus bars 32 and 33 within the edges of sheets 23 and 24. An advantage of the bus bars is that the resistance of the layers 28 and 29 is less by a factor of about 12 than if they were just connected by one edge. Electrical leads 34 and 35 are connected to the bus bars 32 and 33. The leads 34 and 35 are connected to a suitable source of electrical potential (not shown).

The dipole particles 21 are free to move about or rotate in the suspending fluid 27 within the tank-like space 31. They are subject to Brownian movement and become randomized in direction as shown in FIG. 2. The dipole particles within the tank-like space 31 may be needle-like, flat strips, or flake-like in shape, and reflective or absorptive. The electro-optical panel of this invention may be varied from reflective or absorptive to light transmitting. If the dipole particles in the suspending fluid are in random angular positions and absorb light, the panel appears dark. If the dipole particles are light reflecting and random in the fluid the incident light is diffuse-reflected by the dipole particles and the panel appears white, grey or silvery; or colored, if wave length sensitive.

When an electrical field is imposed between the conductive layers 28 and 29 by the application of an electrical potential difference to leads 34 and 35, the dipole particles 21 become aligned with their long dimension parallel to the electric field and normal to the surfaces of sheets 23 and 24. Since the thickness of the dipole particles 21 is small compared to their length, and much smaller than a wave length of light, the light ray 36 is readily transmitted. The second sheet also being transparent, the light then passes out of the cell as transmitted ray 37 (See FIG. 5) and the panel appears transparent. When the electric field intensity is decreased to zero, the dipole particles become randomized by Brownian movement, with their long dimension at various angles as shown in FIG. 4.

FIg. 6 shows conductive coatings 28 and 29 which are covered by transparent protective layers 25 and 26 which face the dipole suspension. The protective layers 25 and 26 are necessary where the dipole suspension are chemically or electrochemically reactive with the transparent conductive coating. The transparent layers 25 and 26 are particularly important when using fluids containing ions capable of reacting with and destroying the transparent conductors 28 and 29. However, when the dipole fluid 27 is substantially free from such reactive ions, then the transparent protective layers 25 and 26 may be omitted and the transparent conducting layers 28 and 29 may be in direct contact with the fluid; without deterioration of the layers or the dipole suspension. Protective layers 25 and 26 may be thin sheets of glass laminated to the transparent conductive coatings 28 and 29, or evaporated coatings about $1\mu$ thick; for example, a transparent silicon monoxide, tantalum oxide, magnesium fluoride and the like.

The thickness of tank-like area 31 containing the dipole fluid 27 may be, for example, from $10^{-2}$ to 1 millimeter. With this spacing substantially complete alignment of the dipoles is obtained using voltages as small as 5 to 500 volts, respectively.

For the smallest times, the electric field intensity employed should be as great as practicable, short of the point at which the dipole suspension is coagulated or deteriorated. An electric field intensity of 0.1 to 100kv/cm may be employed depending on the speed required. The voltage required to attain these electric field intensities depends on the thickness of the dipole suspension layer required to get the required transmittance range.

Coagulation or aggregation of dipole particles, within the suspending fluid may be eliminated by the use of a suitable non-constant electric field across the panel. The alignment time factor, and consequently the required duration of the pulse is a function of the electric field intensity, the cube of the dipole length, a shape factor, the viscosity of the suspending medium, and the dipole concentration.

The effect which tends to cause coagulation is believed to be explained as follows: When the electric field is applied and the dipoles become oriented, each particle assumes as induced polarity. When any two dipoles are aligned the ends which are close together are of opposite polarity. They therefore attract each other, resulting in longitudinal migration and coagulation. This effect may be avoided by pulsing the field so that it lasts only long enough to effect the desired orientation, and is discontinued before any migration can take place.

Avoidance of the coagulation or aggregation effect by the use of a nonconstant electric field leads to still another advantage, in that it makes possible the use of greater concentrations of dipole particles in the suspension, thinner dipole layers, and decreased operating voltage. A small mass of dipoles per unit area (for example 1-100$\mu$g/cm$^2$) is effective to control the light because of their great effective cross section for the capture of incident radiant energy, as discussed below. Greater concentrations of dipoles are proportionally more responsive to the orienting electric field; because as the particles align the induced dipoles attract each other.

After the initial alignment, when the electric field is off, the particles disorient with a relaxation time factor directly proportional to the viscosity, the cube of the particle length, and inversely proportional to the absolute temperature, which is almost constant. Pulses of voltage of a repetition rate such as to make the time between pulses less than the relaxation time factor aligns the particles without coagulation.

Submicron dipoles in a fluid suspension show strong effects of the angle of orientation of the dipole with respect to an incident ray on absorption or reflection. The effective area of a dipole = $\lambda^2/8$ or $L^2/2$ when it is normal to a light ray and parallel to the electric vector, which may be compared to its actual cross section = $L^2/a$ or $\lambda^2/4a$. For example, where $a$ is 25, the ratio of effective to actual cross section is then 12.5. When a dipole in which $L/a << \lambda$ is oriented parallel to the light path the actual cross sectional area is $L^2/a^2$, but the minimum effective cross section is much less; that is, $L^2/a^3$, or $\lambda^2/4a^3$. In the random state the effective cross section is decreased by a factor of 4; that is, to $\lambda^2 132$. The ratio of maximum to minimum cross section is $[(\lambda^2/32)/(\lambda^2/4a^3)] = a^3 18$. Hence, theoretically $q_{rz} = a^3 18$ for $a > 4$. For $a = 10$; $q_{rz} = 125$ in a suspension of ideal dipole particles. However, in practice, if $q_{rz} > 10$ a very useful result is obtained. The resonant response of a dipole has a bandwidth which increases as the ratio of length to width of the dipole increases, that is, thicker dipoles have a wider band width. Changing the ratio of absorption resistance to the radiation resistance varies the cross section of an isolated dipole; thus controlling the absorption and reflection characteristics of a submicron dipole in a suspension to attain specific electro-optical characteristics.

REFLECTING-TRANSMITTING PANEL

A reflecting-transmitting panel having the structure shown in FIGS. 4, 5 and 6 employs a dipole suspension which is diffuse-reflecting when the dipoles are in random orientation; or transmitting, when the electric field is applied and the dipoles are aligned normal to the plane of the sheet. Such a panel is useful as a window, for a radiation control panel, for TV data displays, and the like.

DIFFUSE REFLECTIVE-ABSORPTIVE PANEL

Figure 7:
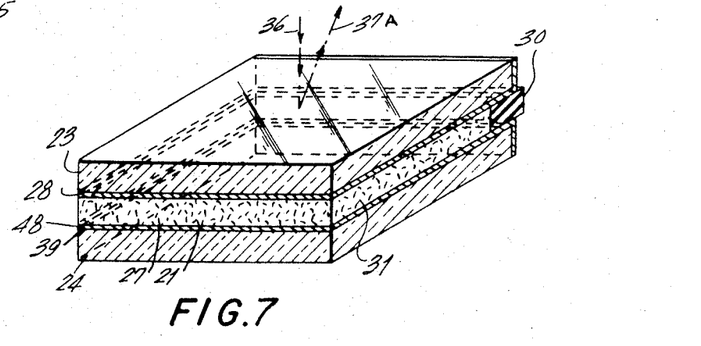
FIG. 7 is a fragmentary perspective view, similar to FIg. 4, of another embodiment of the invention, namely a reflective-absorptive panel.

Electrooptical panels according to FIG. 7 are useful for radiation control on walls, roofs, space vehicles; and with suitable electrodes for TV screens, for data displays and the like. FIG. 7 is identical with FIG. 4, except as follows:

In one embodiment of the panel of FIG. 7 an absorbing conducting surface 39 is employed, and the dipole suspension is diffuse-reflective when the dipoles are in randmom orientation at no voltage and transparent when the electric field is applied and the dipoles are oriented normal to the surface, and the radiation is transmitted to the absorbing surface, and absorbed. This panel is diffuse-reflective when no voltage is applied, and black-absorbing when voltage is applied.

In another embodiment a diffuse-reflecting conducting surface is employed at 39, and the dipole suspension is absorptive black when the dipoles have a random orientation at no voltage, and transparent when the electric field is applied and the dipoles are aligned with their long axes normal to the sheet. The panel is black absorbing when no voltage is applied, diffuse reflecting when voltage is applied.

SPECULAR REFLECTIVE-ABSORPTIVE PANEL

Another embodiment of this invention is an electrically controlled variable reflectance mirror or panel, which becomes specularly reflective on applying voltage, and absorptive when the voltage is removed. This device is useful as an electrically, or photoelectrically, controlled variable transmittance rear view mirror for automobiles, for optical devices and the like.

FIG. 7 may be modified to function as a specularly reflective-absorptive panel. In FIG. 7 the panel comprises parallel glass plates 23 and 24. The tank-like space 31 between the plates 23 and 24 is filled with a suspension of absorbing dipole particles 21, for example, metal or herapathite dipole particles, suspended in a suitable medium 27. Plate 23 is provided with a transparent conductive layer 28, and plate 24 is provided with a conductive specularly reflecting metallic coating or mirror 48. When the dipole suspension fluid contains reactive ions, as with a herapathite dipole suspension, protective coatings 25 and 26 (See FIG. 6) must be applied over the transparent conductive layer 28, and the conductive mirror 48. The protective coatings 35 and 26 may be omitted when a dipole fluid suspension is used which is substantially free from reactive ions as for example, chromium dipoles in a nonionic fluid given herein. When a suitable voltage is applied between the transparent conducting layer 28 and the conductive mirror coating 48, the dipole particles 21 are aligned normal to the panel surface. Light ray 36 is reflected from the mirror coating 48, and is transmitted back out through the dipole suspension and layers in the reverse order, as a specularly reflected ray 37. With the voltage off, the dipole suspension absorbs substantially all the transmitted light. For a rear view automotive mirror the electrooptic reflecting panel may be controlled by headlights approaching from the rear, using a photocell and electric circuit, not shown. With the dipole suspension in the absorbing state, specular reflection occurs only from the front surface of the device. Thus, the specular reflectivity may be photoelectrically controlled from 50 percent for voltage on, to 4 percent for voltage off for day and night visor, respectively.

ELECTROOPTICAL IRIS

Figure 8:
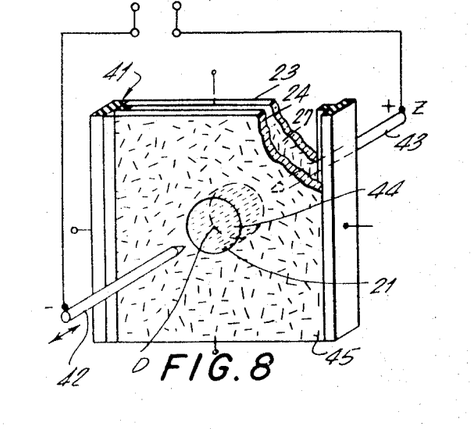
FIG. 8 is a partially cut away perspective view, partially schematic, of another embodiment of the invention, in the nature of an electro-optical iris diaphragm.

FIG. 8 shows an electrooptic iris device which is electrically controllable in diameter. The device comprises a flat cell 41 containing a dipole layer 27 between transparent insulating sheets 23 and 24 (such as glass sheets each 1mm thick). A pair of point electrodes 42 and 43 are located on the same Z axis in the center of the field, one near each outer face of the cell 41. If an alternating current electrical potential difference is applied to the electrodes 42 and 43 a transparent circular spot 44 appears in a dark field. As this potential difference is increased from zero, a threshold value is reached at which a small diameter spot is first formed which depends on the thickness of the sheets 23 and 24, and the thickness and electrooptical characteristics of the suspension 27. The spot is highly transparent within an area 44, of the spot diameter D, in which the dipole particles 21 are aligned parallel to the Z axis. Outside of the spot diameter D, the orientation abruptly changes to random, and this area 45 is opaque. The diameter of the spot D is zero up to the threshold voltage, then has a minimum diameter. The diameter D increases linearly with voltage in a range, and thereafter increases faster than linearly. The total light flux follows a similar law with voltage.

As an example, in an electrooptic iris cell the glass sheets 23 and 24 were each 1mm thick, the herapathite suspension layer was 1mm thick and the point electrodes 42 and 43 in contact with the outer glass surfaces. A transparent circular spot 44 about 8mm in diameter surrounded by a dark area 45 appeared in a herapathite suspension by applying a 60-cycle A.C. potential difference of 5,000 volts rms between the point electrodes. At a frequency of 10KHz the same result is obtained at the relatively small potential difference of about 500 volts rms.

IONIC SHIELDING EFFECT

Ions usually present in the dipole suspending fluid migrate under the influence of the electrical field. Comparatively, "conducting" fluids have a large concentration of ions and "non-conducting" or nonionic fluids have a small concentration of ions.

Ion migration in the dipole suspension produces separation of positive and negative electric charges in a D.C. electric field, setting up a counterfield which decreases the aligning electric field intensity. Even with a small concentration of ions in a D.C. or low frequency A.C. electric field, positive and negative ions migrate to opposite surfaces of the dipole layer or to opposite ends of the dipole particles, decreasing or cancelling the aligning electric field within the dipole layer.

At lower frequencies the ions migrate a greater distance, and periodically concentrate near each end of the dipole layer. These charge concentrations counteract the applied electric field, and the dipole alignment is decreased. However, as the frequency increases above a critical frequency, the ions oscillate only a small distance about a mean position, ion migration and separation of oppositely charged ions is minimized, and the field neutralizing effect substantially eliminated.

Ions present in the dipole fluid may be due to impurities, or may be produced by the electrical of photoelectric breakdown of the suspending medium and/or the dipole particles.

The ion mobility is measured in cm/sec per volt/cm, or $cm^2$/volt-sec. To neutralize the induced charges the ions at the ends of the dipole must travel during a half-cycle a distance equal to the length of a dipole, which is about $10^{-4}$ cm. At a frequency of 5KHz, the half-cycle time is $10^{-4}$ seconds. The rms ion velocity is then $10^{-4}/10^{-4}$ or 1cm/sec. Experimentally this requires about 1,500 volts rms/cm. Hence in this case, the mobility of the ion in the dipole suspension is $1/1,500 = 6.7 \times 10^{-4}$ $cm^2$/volt-sec. Typical ion mobilities are:

| | |
|---|---|
| $Cl^-$ | $6.9 \times 10^{-4}$ $cm^2$/volt-sec |
| $OH^-$ | $18.1 \times 10^{-4}$ |
| $H^+$ | $32.0 \times 10^{-4}$ |

For the herapathite suspension the ion is probalby $I^{--}$ which should have a mobility approximately of $cl^-$.

Figure 9:
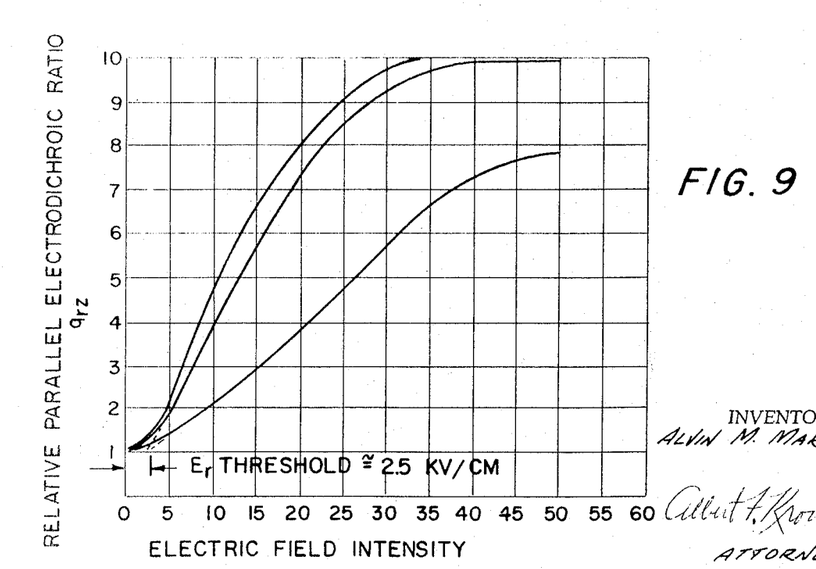
FIG. 9 shows curves of the parallel electrodichroic ratio versus electric field intensity for frequencies of 1, 10, and 100KHz.

When a D.C. electric field is applied, ions tend to migrate toward the transparent electrodes or conductors 28 and 29. When transparent insulating layers 25 and 26 are provided over the transparent conductors a shielding effect is produced as the positive ions move toward and collect at the transparent wall in the vicinity of the negative electrode, and the negative ions move toward and collect at the transparent wall in the vicinity of the positive electrode. As a result, the electric field applied across the dipole suspension layer decreases eventually to zero and a light pulse is produced. Migration of ions is avoided by using an alternating field at frequencies in excess of 1KHz, and preferably 10KHz or more. FIG. 9 shows the improved alignment obtained at a given voltage as the frequency is increased. Pulsed A.C. may be employed in which each pulse is of sufficient duration to include at least several cycles of the current alternation.

With insulating nonionic fluids containing a suspension of stable dipole particles such as metal particles, the transparent insulating coatings 25 and 26 may be omitted and the transparent conductors 28 and 29 may then be in direct contact with the dipole suspension fluid 27 and a D.C. electric field may be used. In this case the ions discharge on the transparent conductors 28, 29. There is little or no deterioration of the suspension or the transparent conductors. Examples of nonionic fluids are: aromatics, such as benzene and toluol; aliphatics, such as hexane, decane; diphenyl chloride; esters such as, dimethyl phthalate, di iso amyl adipate; silicone oil, etc., having resistivities in excess of 30 megohmcm.

With transparent conductors in direct contact with the dipole suspension layer, a steady alignment of dipoles and light transmission occurs, however with herapathite suspensions, the transparent conductors are destroyed by electrolysis and chemical action, and the dipole suspension is agglomerated and deteriorated. This does not occur when the transparent conductive coat are protected with a transparent insulating layer, but in this case an alternating electric field must be used to align the dipoles.

As an example, with dipole cell having transparent conductive coatings, separated by two 0.030cm glass covers and an herapathite suspension layer 0.07cm thick, initial transmittance in the random state was about 4 percent. On applying a 10kv D.C. pulse, the transmittance increased momentarily to 20 percent then returned to the initial transmittance. This corresponds to parallel electrodichroic ratio $q_{rz} = 2$. Because of the thickness of the glass layers between the transparent electrodes 55kv or about 790kv/cm was applied across the dipole suspension layer. The small change in transmittance and subsequent decrease back to the miminum is due to the migration of ions which partially and then completely shields the field. An applied 10kv 60-cycle A.C. field increased the electrodichroic ratio to $q_{rz} \cong 3+$. The effect of increasing frequency of the applied electric field is shown in FIG. 9. The electrodichroic ratio increases at greater frequencies and reaches a maximum; and the electric field intensity is decreased: at 1KHz, $q_{rz} = 7.8$ at 5kv/cm; at 10KHz, $q_{rz} = 9.8$ at 4kv/cm; and at 100KHz, $q_{rz} = 10$ at 3.3kv/cm, the voltages being given in rms. At 100 KHz only 165 rms is required across a 0.05 cm dipole layer thickness.

With an A.C. electric field the alignment of the dipoles increases as the voltages passes through a maximum at each half-cycle. Each time the voltage passes through a minimum, the dipoles disalign because of the randomizing effect of Brownian motion. Since the disalignment time is very long compared with the alignment time, on each successive half-cycle the particles become more nearly parallel to the direction of the applied electric field, and the transmittance increases until substantially maximum alignment is achieved.

Thus, a smaller voltage at a greater frequency produces the same alignment as a large voltage at a smaller frequency. As the frequency is increased the ionic shielding effect is diminished or eliminated, and the applied electric field more effectively produces alignment of the dipoles.

A step D.C. voltage is effective to align the dipole particles, but this alignment is only momentary. Shortly after applying the step D.C. voltage, an ionic shielding layer is set up on each face of the dipole layer, counteracting the applied D.C. field. The dipole particles are then shielded from the applied field. The dipole particles then start to disalign under randomizing molecular impacts due to Brownian motion. For the step D.C. voltage to cause an initial alignment, the rise time of the applied voltage must be very short; for example less than 10 microseconds.

The ionic shielding also may be obviated by transparent conducting coatings in direct contact with the dipole suspension. D.C. or A.C. or pulses may be used. The ions are discharged as they migrate to the electrodes and large values of the electrodichroic ratio are obtained, for example, $q_{rz} = 10$. In this case, however, dipoles in a relatively nonionic, nonreacting fluid must be used in contact with the transparent conductive coatings.

Utilizing an A.C. voltage pulse technique with frequencies in excess of 1KHz, and preferably 10KHz, the dipoles continue to align during each half-cycle and, therefore, substantial alignment may be achieved with a low field strength. The alignment persists as long as a high frequency field is applied. The disalignment that occurs between cycles is relatively small compared to the alignment effect occurring during each half-cycle.

There are additional advantages to be gained by utilizing the frequencies in excess of 1KHz. The transparent conducting electrodes may be covered with an insulating transparent layer such as glass. This protects the transparent conductive coating from destruction due to electrolytic action, and also prevents the contamination of the dipole solution by the products of electrolytic action.

Herapathite dipole suspensions are particularly sensitive to electrolytic destruction yet, when placed between a dipole cell in which the transparent conducting electrodes were covered with a thin glass layer, these suspensions were stable for over 16 hours at an applied field strength of 1.5kv/cm at 25KHz.

It would be understood that other metals capable of forming whisker rods or plates may be employed, including aluminum, copper, gold, silver, titanium, antimony, cadmium, indium, tantalum and thalium.

CHARACTERISTICS

The relaxation time factor will vary from about 10 microseconds for suspending fluids having small viscosity and dipoles having short lengths; for example, 10mp and 1,000 A respectively; to about 0.25 seconds for fluids having a greater viscosity, for example, $10^3$mp and a dipole length of 4,000A. The electric alignment time factor depends upon the strength of the electric field intensity which is applied to the dipole suspension layer. For example, speeds of 100 times of the relaxation time factor may be obtained with large electric field intensities. Thus, the ultimate electric alignment time is in the nanosecond range and the relaxation time in the absence of electric field is in the microsecond range, for short dipoles in suspending fluids of low viscosity.

Table I shows values measured for the physical characteristics given for an experimental herapathite dipole suspension and experimental chromium dipole suspension compared to ideal values which were calculated from theory:

TABLE I

| PARAMETER | UNITS | SYMBOL |
| --- | --- | --- |
| Maximum transmittance | % Transmittance | $\bar{T}$ |
| corresponding to | optical density | $\bar{D}$ |
| minimum transmittance | % Transmittance | $T_r$ |
|  | optical density | $D_r$ |
| Electrodichroic ratio (maximum at λ) at | nm = $10^{-7}$ cm | $q_{rz}$ |
| Electrodichroic response | Δ8(kV/cm)$^{-1}$ | $\sigma_{rz}$ |
| Dipole particle mass/unit area in light path | g/cm$^2$ | M |
| Electrodichroic sensitivity | Δq(kV g/cm$^3$)$^{-1}$ | $S_{rz}$ |
| Dipole Length | cm × $10^{-8}$ = A | L |
| Dipole thickness | cm × $10^{-8}$ = A | L/a |
| Fluid viscosity | millipoises | η |
| Relaxation time factor (brownian) | sec μsec | $\tau_B$ |

TABLE I-Continued

| PARAMETER | UNITS | | SYMBOL | |
|---|---|---|---|---|
| Minimum electric alignMENT TIME FACTOR | sec $\mu$sec | | $\tau$ | |
| SYMBOLS | HERAPATHITE DIPOLES | CHROMIUM DIPOLES | OPTIMUM DIPOLES | |
| T | 55.0 | 80.0 | 96.0 | 50 |
| D | 0.25 | 0.11 | 0.02 | 0.3 |
| $T_r$ | 0.10 | 0.10 | 0.1 | Opaque |
| $D_r$ | 3.0 | 3.0 | 3.0 | 45 |
| $q_{rz}$ | 12. | 28 | | 150 |
| at $\lambda$ | 575 | 3200 | | |
| $\sigma_{rz}$ | 11 | 33 | | |
| M | $410 \times 10^{-6}$ | $31 \times 10^{-6}$ | $10^{-6}$ | |
| $S_{rz}$ | $2.7 \times 10^4$ | $10^6$ | | |
| L | $5 \times 10^3$ | $7 \times 10^3$ | $2 \times 10^3$ | |
| L/a | $2 \times 10$ | $5 \times 10$ | $10^2$ | |
| $\eta$ | 180 | 180 | 2 | |
| $\tau_H$ | $10^{-2}$ | | $10^{-5}$ | |
| | $10^4$ | $10^4$ | 10 | |
| | $10^{-4}$ | $10^{-3}$ | $10^{-7}$ | |
| | $10^2$ | $10^3$ | $10^{-1}$ | |

The dipole suspension, novel dipole materials and the various embodiments of the apparatus according to this invention provide a new and improved method of controlling visible light, and adjacent portions of the electromagnetic spectrum. They provide for the first time a practical adaptation of the use of dipole usspensions to the large area control of light, free of the difficulties which have beset prior attempts to make use of dipole suspensions for such purposes.

The electrooptical material and devices of this invention have been described with reference to certain embodiments, illustrated by way of certain drawings, and exemplified by specific examples. These are illustrative only, as many alternatives and equivalents will readily occur to those skilled in the art, without departing from the spirit and scope of the invention. The invention is therefore not to be construed as limited, except as set forth in the appended claims.

Having thus fully described the invention what is claimed as new and sought to be secured by Letters Patent of the United States is:

1. A light controlling device comprising in combination a transparent suspending medium, a plurality of submicron dipole members rotatably carried within the medium to form a suspension, spaced transparent sheets to contain the suspension, opposed electrodes disposed on each side of said suspension, one of said electrodes being a transparent conductive film and the other of said electrodes being reflective, and means to apply an electric field across said electrodes to control the disposition of the dipole suspension from light absorptive in a random state to transparent in an aligned state.

2. A device according to claim 1 in which the reflective electrode is specularly reflective.

3. A device according to claim 1 in which at least one of the electrodes is a light absorptive conductor and the dipolar suspension is reflective in the random state and light transmissive in the aligned state.

4. A device according to claim 1 in which the electrodes are in direct contact with the dipole suspension and the suspending medium is substantially free of ions.

5. A device according to claim 4 in which the fluid is selected from the class consisting of aromatics, such as, toluol, benzene; esters such as, di iso amyl adipate, dimethyl phthalate; silicone oils; aliphatics such as hexane, decane; chlorinated organics, such as chlorinated diphenyls, and the dipoles are selected from the class consisting of metals, semiconductors and dichroic crystals.

6. A light controlling device according to claim 1, wherein the suspending medium is in the form of a layer having a thickness of at least $10^{-3}$ cms and not more than $10^{-1}$ cms.

7. A light controlling device comprising in combination a transparent suspending medium a plurality of submicron dipole members rotatably carried within the medium to form a suspension, spaced transparent sheets to contain the suspension, opposed electrodes disposed on each side of said suspension, at least one of said electrodes being a transparent conductive film, means to apply an electric field across said electrodes to control the disposition of the dipole suspension from light absorptive in a random state to transparent in an aligned state, wherein a transparent insulating layer is disposed between each of the electrodes and the dipole suspension, the suspending medium contains free ions, and the electric field is non-constant.

8. A device for forming an electro-optic iris comprising in combination, a transparent suspending medium, a plurality of submicron dipoles in said medium, spaced sheets for containing said suspension, at least one of said sheets being transparent, opposed electrodes on each side of the suspension, at least one of said electrodes being a point electrode, and means to apply an electric field across the said electrodes.

9. A device according to claim 8 in which both the spaced electrodes comprise point electrodes disposed along the same axis, normal to the plane of the spaced sheets.

10. A device according to claim 8 in which the dipole suspension contains free ions, is contained between transparent insulating sheets and the electric field is non-constant.

11. A device according to claim 8 in which the electrodes are in contact with the mediun and the medium is substantially free of ions.

12. A light controlling device comprising a suspension of submicron dipoles in which the electrodichroic ratio is at least 10, for an electric field intensity exceeding 3kv/cm for a frequency in excess of 1KHz.

13. An electro-optic panel comprising spaced sheets, a spacer peripherally separating said sheets to form a thin large area cell having a thickness in the order of from $10^{-3}$ cms to $10^{-1}$ cms, electrode layers on said sheets, a dipole fluid suspension layer within said cell, leads attached to said electrodes, at least one sheet and electrode layer being transparent, and at least one transparent insulating layer separating said dipole suspension from at least one of said electrode layers.

14. An electrooptical panel according to claim 13 in which the transparent electrode coatings are connected to bus bars inserted into the panel circumferentially a short distance from the edge 15. A device according to claim 13 in which at least one layer is nontransparent and light absorbing.

16. A electro-optic panel comprising spaced sheets, a spacer peripherally separating said sheets to form a thin large area cell having a thickness of the order of from $10^{-3}$ cms to $10^{-1}$ cms, electrode layers on said sheets, a dipole fluid suspension layer within said cell, leads attached to said electrodes, one of said sheets and one of said electrode layers being transparent, the other of said electrode layers being reflecting, and said electrode layers being in contact with the surface of said dipole fluid suspension layer.

17. An electrooptic specular mirror according to claim 16 in which the dipole suspension is absorbing in the random state, the reflecting layer is specularly reflecting, and whose transparency may be electrically varied to provide a variable reflectivity.

18. An electrooptical mirror according to claim 17 in which the dipole fluid suspension is substantially opaque-absorbing at no voltage with the dipoles in the random state, and in which the specular reflectance is about 50 percent when voltage is applied and the dipoles are aligned substantially normal to the sheet surface.

19. An electrooptical mirror according to claim 17 in which a specular reflection is substantially entirely from the surface of the device closest to incident light on the device and is of the order of 4 percent, at no voltage.

20. An electro-optic panel which may be varied from diffuse-reflective to absorbent, comprising spaced sheets, a spacer peripherally separating said sheets to form a thin large area cell having a thickness in the order of from $10^{-3}$ cms to $10^{-1}$ cms, electrode layers on said sheets, a dipole fluid suspension layer within said cell, leads attached to said electrodes, at least one sheet and electrode layer being transparent, at least one electrode layer being nontransparent and light absorbing, said dipolar suspension being diffuse-reflective with dipoles in the random state at no voltage and being transmissive with the dipoles in the aligned state with voltage applied, and the inner face of the sheet furthest from the incident light being light absorbing.

21. An electro-optic panel which varies from absorbing black to diffuse-reflective, comprising spaced sheets, a spacer peripherally separating said sheets to form a thin large area cell having a thickness in the order of from $10^{-3}$ cms to $10^{-1}$ cms, electrode layers on said sheets, a dipole fluid suspension layer within said cell, leads attached to said electrodes, at least one sheet and electrode layer being transparent, said dipole suspension becoming transparent when voltage is applied and light is diffuse-reflected from the inner face of the sheet furthest from the incident light.

* * * * *